United States Patent
Vald'Via et al.

(10) Patent No.: US 9,216,325 B2
(45) Date of Patent: Dec. 22, 2015

(54) SHAFT PLUGS FOR GOLF CLUBS AND METHODS TO MANUFACTURE GOLF CLUBS

(71) Applicant: Karsten Manufacturing Corporation, Phoenix, AZ (US)

(72) Inventors: Gil Vald'Via, Phoenix, AZ (US); Frank Gunshinan, Phoenix, AZ (US)

(73) Assignee: KARSTEN MANUFACTURING CORPORATION, Phoenix, AZ (US)

( * ) Notice: Subject to any disclaimer, the term of this patent is extended or adjusted under 35 U.S.C. 154(b) by 91 days.

(21) Appl. No.: 13/828,697

(22) Filed: Mar. 14, 2013

(65) Prior Publication Data

US 2014/0274447 A1  Sep. 18, 2014

(51) Int. Cl.
 *A63B 53/02* (2015.01)
 *F16L 55/11* (2006.01)

(52) U.S. Cl.
 CPC ............ *A63B 53/02* (2013.01); *F16L 55/1141* (2013.01); *Y10T 29/49885* (2015.01)

(58) Field of Classification Search
 CPC ............... A63B 53/02; F16L 55/1141; Y10T 29/49885
 See application file for complete search history.

(56) References Cited

U.S. PATENT DOCUMENTS

| | | | | |
|---|---|---|---|---|
| 729,835 A * | 6/1903 | Barnes | | 215/299 |
| 2,020,679 A | 11/1935 | Fitzpatrick et al. | | |
| 2,121,387 A | 6/1938 | Houser | | |
| 2,196,785 A * | 4/1940 | Takiguchi | | 215/355 |
| 2,746,632 A * | 5/1956 | Bramming | | 215/270 |
| 3,269,581 A * | 8/1966 | Calder | | 220/240 |
| 3,471,179 A * | 10/1969 | Sixt | | 285/148.22 |
| 3,578,027 A * | 5/1971 | Zopfi | | 138/89 |
| 3,625,513 A * | 12/1971 | Ballmer | | 473/310 |
| 3,800,791 A * | 4/1974 | Visor | | 128/864 |
| 4,402,641 A * | 9/1983 | Arff | | 411/510 |
| 5,374,062 A | 12/1994 | Kochevar | | |
| 5,437,450 A * | 8/1995 | Akatsuka et al. | | 473/320 |
| 5,540,435 A | 7/1996 | Kawasaki | | |
| 5,653,645 A | 8/1997 | Baumann | | |
| 5,709,614 A | 1/1998 | Horiba | | |
| 5,720,671 A | 2/1998 | Cheng | | |
| 5,820,483 A | 10/1998 | Preece et al. | | |
| 6,032,695 A * | 3/2000 | Wellen et al. | | 138/89 |
| 6,183,233 B1 * | 2/2001 | Preece et al. | | 425/117 |
| 6,360,779 B1 * | 3/2002 | Wagner et al. | | 138/92 |
| 6,494,463 B1 * | 12/2002 | Rank | | 277/607 |
| 6,884,179 B2 | 4/2005 | Hoffman et al. | | |
| 6,890,269 B2 | 5/2005 | Burrows | | |
| 6,997,819 B2 | 2/2006 | Naylor et al. | | |
| 7,108,618 B2 | 9/2006 | Frischmon et al. | | |
| 7,225,836 B2 * | 6/2007 | Field | | 138/89 |
| 7,335,113 B2 * | 2/2008 | Hocknell et al. | | 473/307 |
| D570,966 S * | 6/2008 | Gilligan | | D23/260 |
| 7,490,629 B2 * | 2/2009 | Williams et al. | | 138/89 |
| 7,819,754 B2 | 10/2010 | Evans et al. | | |
| 7,892,107 B2 | 2/2011 | Vald'Via et al. | | |
| 8,133,132 B2 | 3/2012 | Takeuchi | | |
| 8,167,735 B2 | 5/2012 | Evans et al. | | |

(Continued)

FOREIGN PATENT DOCUMENTS

TW  M289145  4/2006

*Primary Examiner* — Stephen Blau

(57) ABSTRACT

Embodiments of shaft plugs for golf clubs and methods to manufacture golf clubs with shaft plugs are generally described herein. Other embodiments of shaft plugs may be described and claimed.

14 Claims, 9 Drawing Sheets

(56) References Cited

U.S. PATENT DOCUMENTS

| | | | |
|---|---|---|---|
| 8,167,736 B2 | 5/2012 | Vald'Via et al. | |
| 8,763,831 B2 * | 7/2014 | Garcia | 215/355 |
| 8,833,398 B2 * | 9/2014 | Williams | 138/89 |
| 2002/0077193 A1 | 6/2002 | Takeda | |
| 2003/0207720 A1 * | 11/2003 | Sery | 473/256 |
| 2005/0096148 A1 | 5/2005 | Noble et al. | |
| 2006/0254660 A1 * | 11/2006 | McIlwain | 138/89 |
| 2006/0293128 A1 | 12/2006 | Frischmon et al. | |
| 2008/0141574 A1 * | 6/2008 | Jones | 40/660 |
| 2010/0255927 A1 * | 10/2010 | Evans | 473/307 |
| 2011/0084045 A1 | 4/2011 | Self | |
| 2014/0175100 A1 * | 6/2014 | Foresman et al. | 220/305 |

\* cited by examiner

SHAFT PLUGS FOR GOLF CLUBS AND METHODS TO MANUFACTURE GOLF CLUBS

FIELD

The present document generally relates to golf clubs, and in particular to shaft plugs for sealing off a lumen of a club shaft during the manufacture of the golf club.

BACKGROUND

In the manufacture of a golf club, the club shaft may be secured within the hosel of a club head using an epoxy applied into the hosel using a metal rod. The tip of the club shaft may then be rolled over the epoxy by hand before assembly of the golf club. During assembly, the tip of the club shaft with the coated epoxy may be inserted into a hosel sleeve to secure the tip of the club shaft to the hosel of the club head. In particular, the hosel sleeve may be inserted into the hosel of the club head such that the epoxy fills a predetermined gap therein to create a secure attachment between the tip of the club shaft and the club head through the hosel sleeve. During this attachment process, any excess epoxy from the club shaft can flow into the shaft lumen formed at the tip the club shaft, thereby requiring the epoxy to be removed.

BRIEF DESCRIPTION OF THE DRAWINGS

Corresponding reference characters indicate corresponding elements among the view of the drawings. The headings used in the figures do not limit the scope of the claims.

DESCRIPTION

Figure 1:
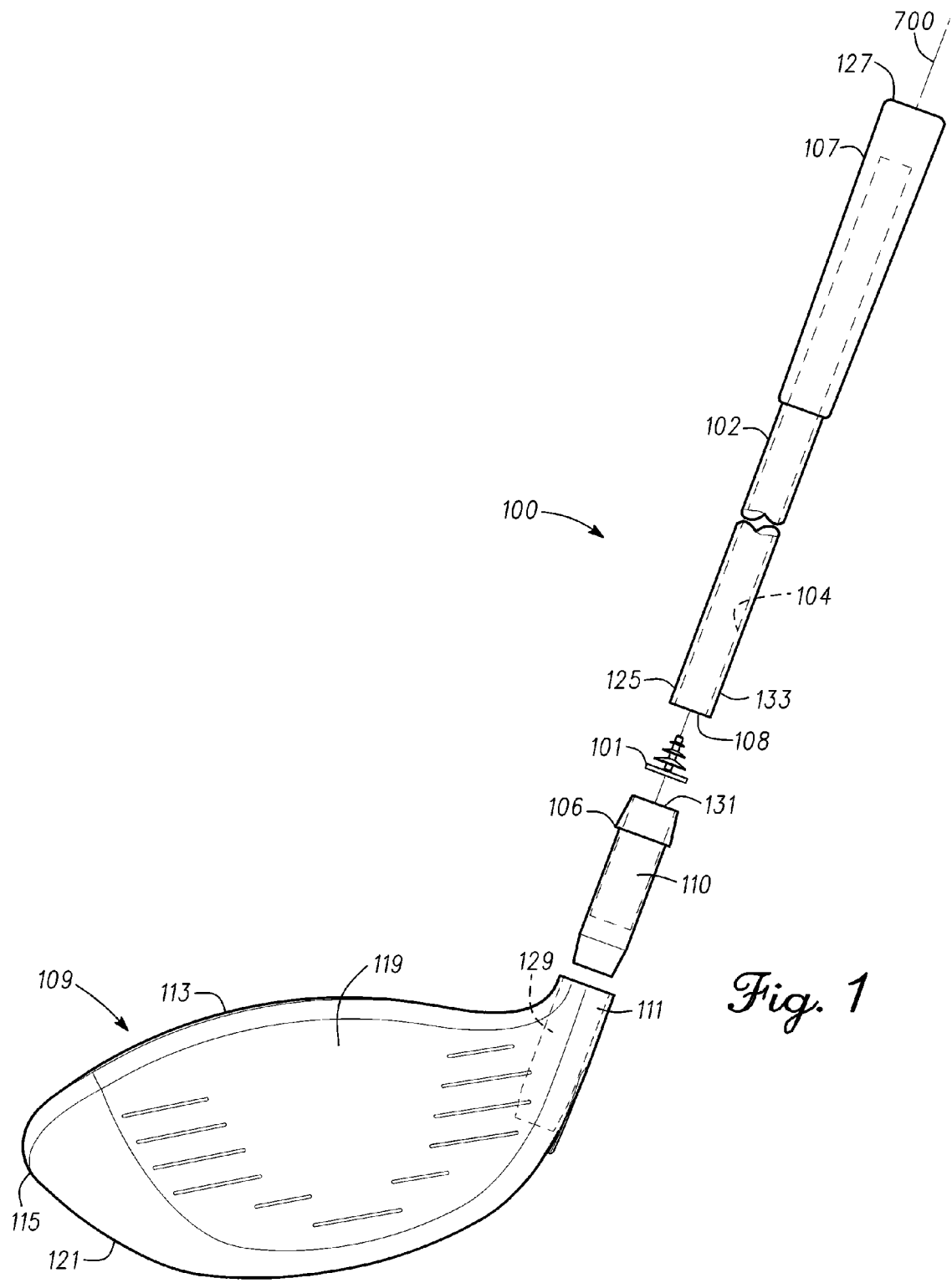
FIG. 1 is an exploded view of one embodiment of a golf club.

Golf clubs and methods of manufacturing a golf club using a shaft plug that seals off a shaft lumen of a club shaft during manufacture of the golf club are described herein. Referring to the drawings, an embodiment of a golf club is illustrated and generally indicated as 100 in FIGS. 1-20. As shown in FIG. 1, one embodiment of the golf club 100 may include a club shaft 102 having an inner surface 135 (FIGS. 2 and 3) that defines a shaft lumen 104 along a longitudinal axis 700 of the club shaft 102 in which the shaft lumen 104 may extend substantially the length of the club shaft 102. The club shaft 102 defines a distal portion 125 with an outer surface 133 configured to be engaged within a hosel sleeve 106 for securing the distal portion 125 of the club shaft 102 to a club head 109. The club shaft 102 may also define a proximal portion 127 configured to be engaged to a grip 107 used for gripping the club shaft 102 by an individual. As further shown, the shaft lumen 104 may communicate with a lumen opening 108 formed at the distal portion 125 of the club shaft 102, which is configured to engage a shaft plug 101.

During the manufacture of the golf club 100 the distal portion 125 of the club shaft 102 is secured within the club head 109. In some embodiments, the club head 109 may be a driver-type club, a wood-type club, a hybrid-type club, or an iron-type club that defines a hosel 111, a back 113, a toe 115, a face 119, and a sole 121. As further shown in FIG. 1, the hosel 111 may define an interior space 129 configured to receive therein the hosel sleeve 106 for engaging the distal portion 125 of the club shaft 102 to the hosel 111 of the club head 109 using an epoxy 123 (FIGS. 2 and 3).

Figure 2:
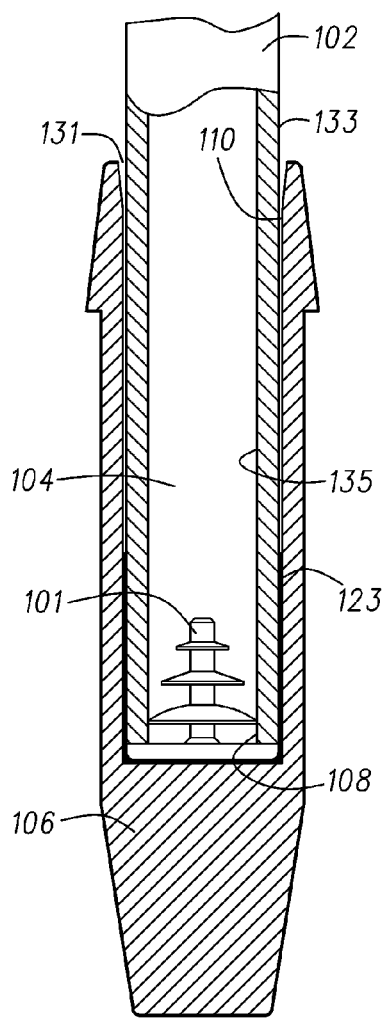
FIG. 2 is a partial cross-sectional view of the golf club showing a shaft plug engaged to a club shaft secured within a hosel sleeve of the golf club.
Figure 3:
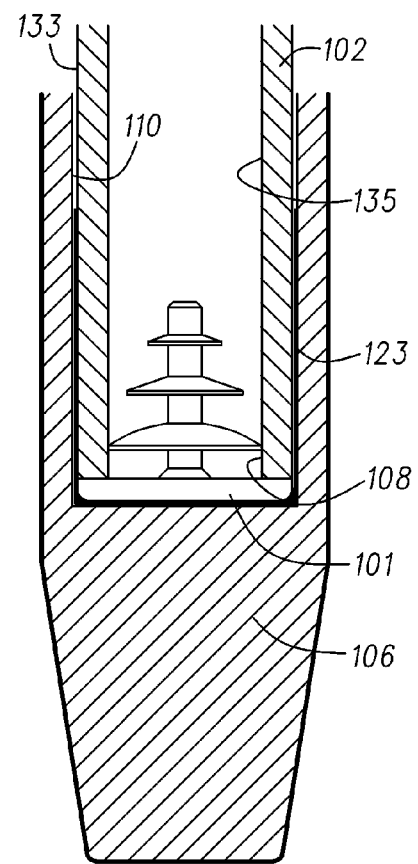
FIG. 3 is another view of the club shaft, shaft plug and hosel sleeve of FIG. 2.

Referring to FIGS. 1-3, in one embodiment the hosel sleeve 106 defines a sleeve recess 110 in communication with an opening 131 (FIGS. 1 and 2) and is configured to receive therein the distal portion 125 of the club shaft 102. A shaft plug 101 may be inserted into the shaft lumen 104 to seal off the lumen opening 108 such that the epoxy 123 (FIGS. 2 and 3) that coats the distal portion 125 of the club shaft 102 does not enter the shaft lumen 104 during assembly of the golf club 100.

Figure 4:
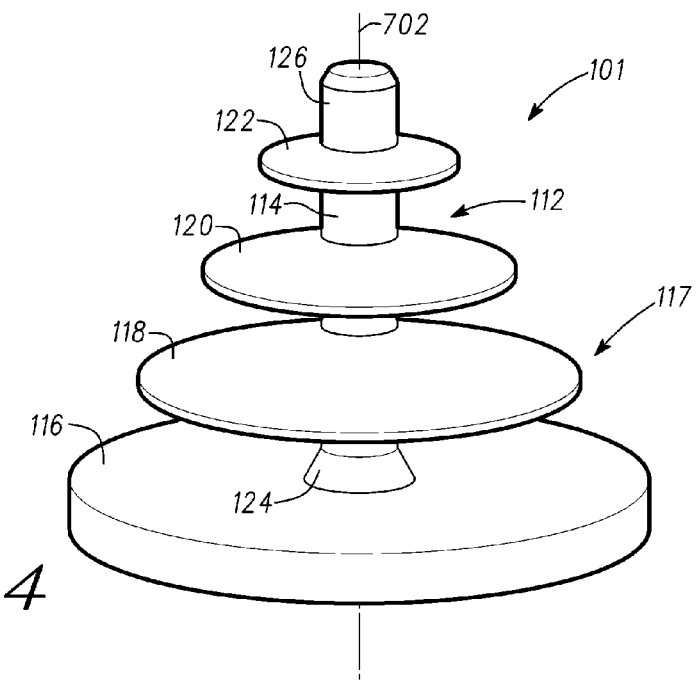
FIG. 4 is an elevated perspective view of a first embodiment of the shaft plug of FIG. 2.
Figure 5:
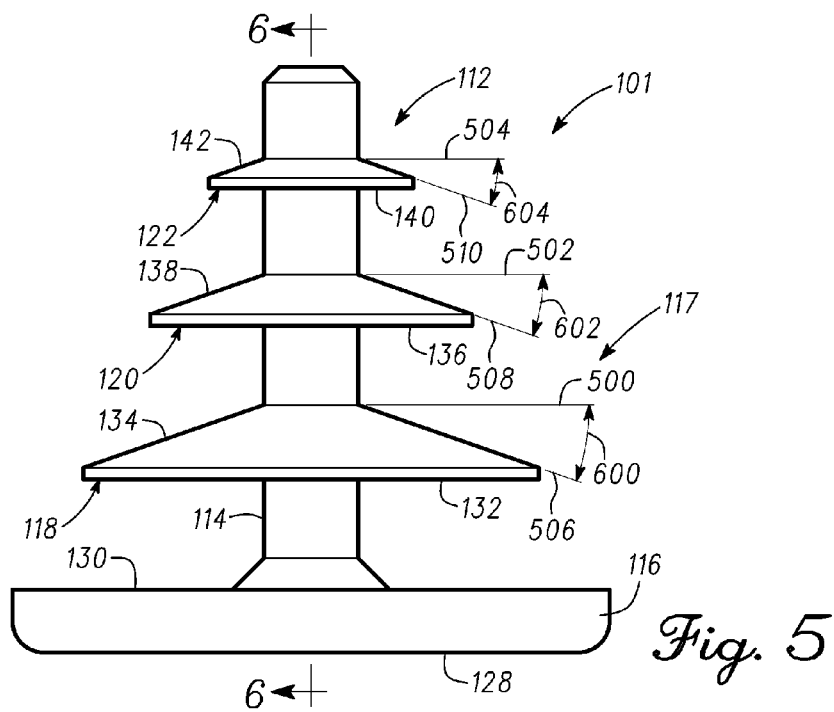
FIG. 5 is a side view of the shaft plug of FIG. 2.

Referring to FIGS. 4-8, the shaft plug 101 forms a shaft plug body 112 configured to seal off the shaft lumen 104 when engaged therein. As shown in FIG. 4, the shaft plug body 112 may include an axial shaft member 114 defining a distal end 124 and a proximal end 126 with a sealing member 116 formed at the distal end 124 of the axial shaft member 114 that extends outwardly from the axial shaft member 114 at a substantially perpendicular angle relative to longitudinal axis 702 defined by the axial shaft member 114. In some embodiments, the shaft plug body 112 includes a plurality of internal members (generally indicated as 117 in FIGS. 4-7) formed between the sealing member 116 and the proximal end 126 of the axial shaft member 114. In one embodiment the plurality of internal members 117 may include a first internal member 118, a second internal member 120, and a third internal member 122 that outwardly extend from the axial shaft member 114 at a substantially perpendicular angle relative to longitudinal axis 702 defined by the axial shaft member 114. While the above examples may describe a particular number of internal members 117, the apparatus, methods, and articles of manufacture described herein are not limited in this regard.

Figure 6:
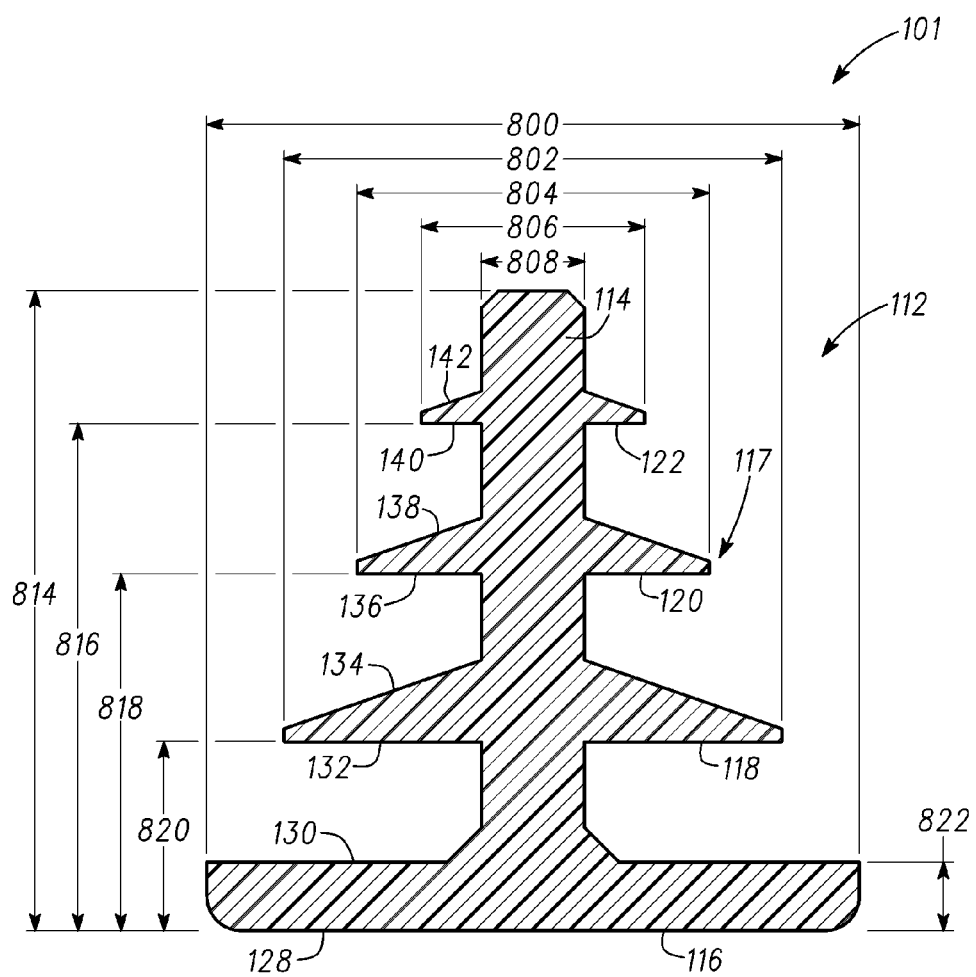
FIG. 6 is a cross-sectional view of the shaft plug taken along line 6-6 of FIG. 5.
Figure 7:
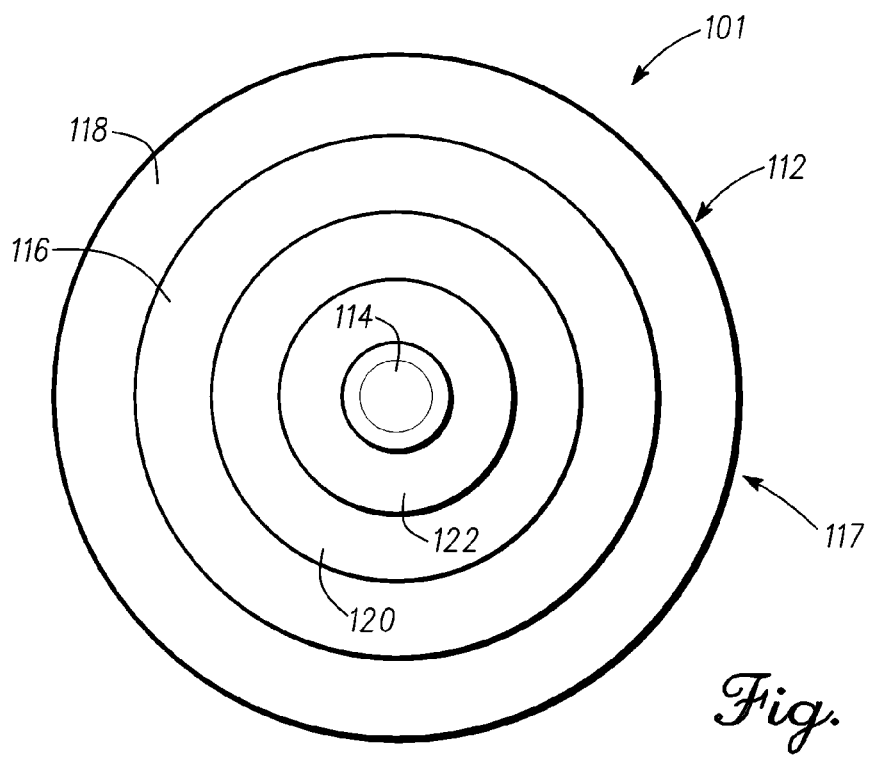
FIG. 7 is a top plan view of the shaft plug of FIG. 2.
Figure 8:
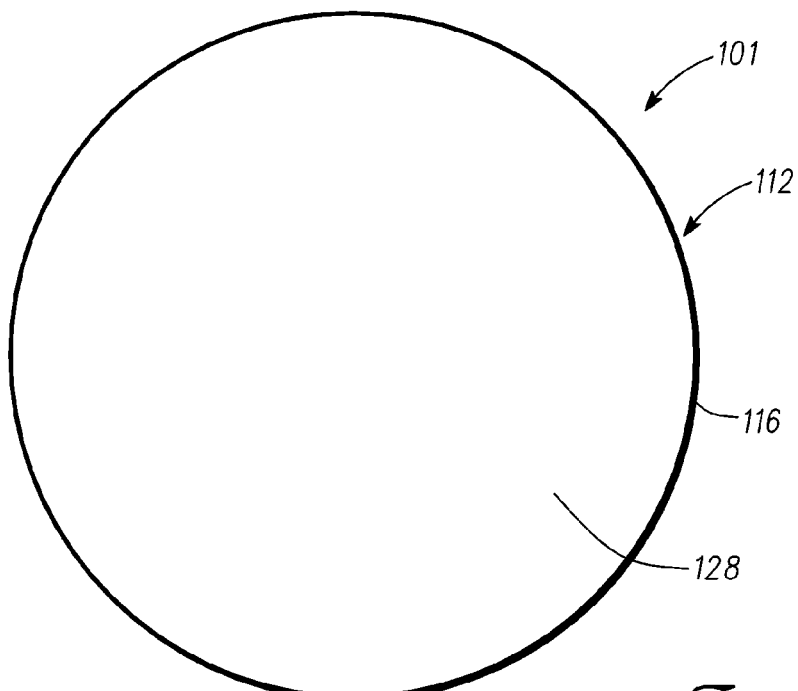
FIG. 8 is a bottom plan view of the shaft plug of FIG. 2.

In some embodiments as shown in FIG. 7, the sealing member 116 and the plurality of internal members 117 have substantially circular or concentric configurations. While the figures may depict the plurality of internal members 117 having the same or similar configuration, the apparatus, methods, and articles of manufacture described herein are not limited in this regard. In particular, two or more of the plurality of internal members 117 may have different configurations. For example, the first internal member 118 may have a circular configuration whereas the second and/or third internal members 120 and 122, respectively, may have a hexagonal, octagonal, or other polygonal configuration(s). In some embodiments, the sealing member 116 has a diameter greater than the respective diameters of the first, second and third internal members 118, 120 and 122 and is configured to block, plug, and/or otherwise seal off the lumen opening 108 (FIGS. 2 and 3) of the club shaft 102 when the shaft plug 101 is inserted into the shaft lumen 104 (FIGS. 2 and 3). In some embodiments, the respective diameters of the sealing member 116 and the first, second and third internal members 118, 120 grow progressively smaller from the sealing member 116 to the third internal sealing member 122 as illustrated in FIG. 6 in which the sealing member 116 and the first internal member 118 are configured to seal off the shaft lumen 104 and prevent the egress of epoxy 123 (FIGS. 2 and 3) into the shaft lumen 104. In some embodiments, the first, second and third internal members 118, 120 and 122 may be configured to maintain substantial contact with the interior surface of the shaft lumen 104 to establish respective fluid tight barriers that prevent the fluid flow of epoxy 123 through the shaft lumen 104.

In one embodiment, the sealing member 116 may have a diameter that is greater than the diameter of the lumen opening 108 for sealing off the lumen opening 108 to fluid flow communication. When the shaft plug 101 is engaged to the shaft lumen 104 through the lumen opening 108, a second flat surface 130 (FIGS. 5 and 6) defined by the sealing member 116 comes into contact with the outer surface 133 of the club shaft 102 proximate the lumen opening 108, thereby sealing off the shaft lumen 104 and preventing any epoxy 123 (FIGS. 2 and 3) from entering therein.

Figure 9:
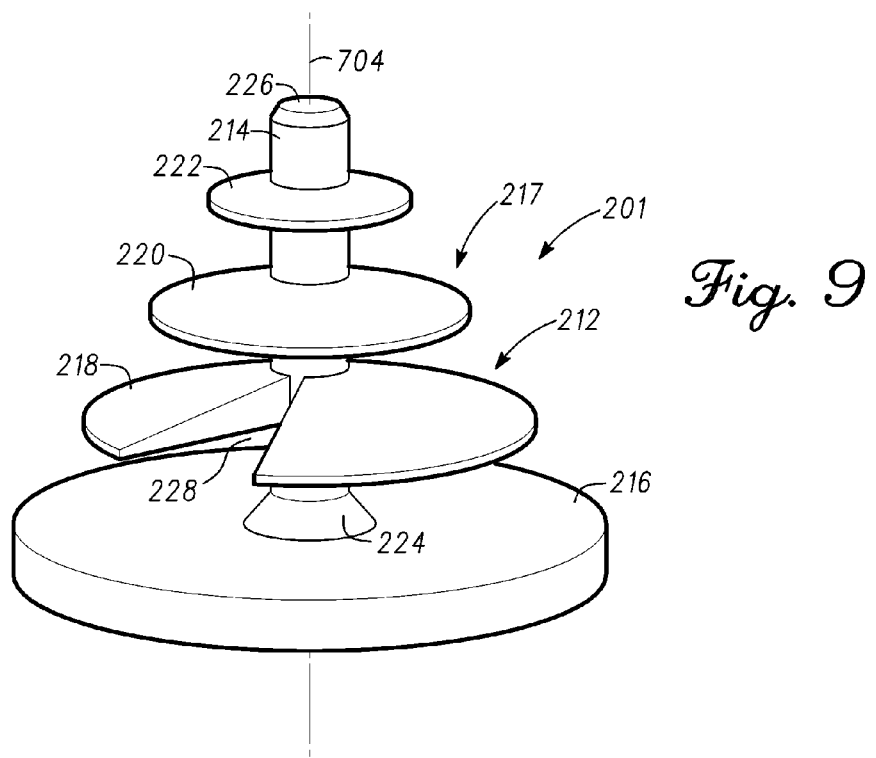
FIG. 9 is an elevated perspective view of a second embodiment of a shaft plug.
Figure 11:
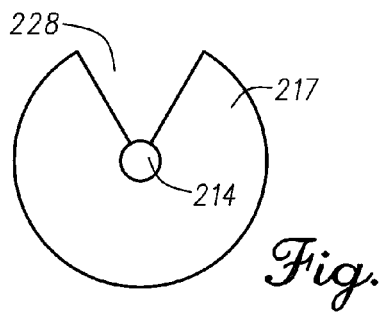
FIG. 11 is a top plan view of a first embodiment for a first internal member of a shaft plug showing a single cut-away configuration.
Figure 13:
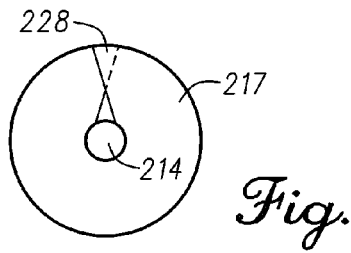
FIG. 13 is a top plan view of the first embodiment for a first internal member showing a single cut away configuration in a deformed condition.

Referring to FIG. 9, a second embodiment of the shaft plug, designated 201, may form a shaft plug body 212 having substantially the same configuration as shaft plug 101 with the exception that one or more of the internal members 217 may define a deformation that allows one or more of the plurality of internal members 217 to deform and establish substantial contact with the surface of the shaft lumen 104 (FIGS. 1-3) when the shaft plug 201 is inserted into the shaft lumen 104. For example, in one embodiment the first internal member 218 may define a deformation that allows the first internal member 218 to deform and establish substantial contact with the surface of the shaft lumen 104 (FIGS. 1-3) when the shaft plug 201 is inserted into the shaft lumen 104. In this particular embodiment, the shaft plug 201 includes an axial shaft member 214 defining a distal end 224 and a proximal end 226 with a sealing member 216 formed at the distal end 224 of the axial shaft member 214 that is configured to seal off the lumen opening 108 (FIGS. 2 and 3) of the shaft lumen 104. In some embodiments, the shaft plug body 212 may further include a plurality of internal members 317, for example, a first internal member 218, a second internal member 220, and a third internal member 222, which extend outwardly at a substantially perpendicular angle along the axial shaft member 214 relative to longitudinal axis 704 defined by the axial shaft member 214. As shown in FIG. 11, the shaft plug 201 differs from shaft plug 101 in that at least one of the plurality of internal members 217, for example the first internal member 218, has a deformable cut-away 228 that extends from the axial shaft member 214 to the periphery of the first internal member 218. Referring to FIG. 13, for example, the deformable cut-away 228 facilitates deformation of the respective internal member 217 when the shaft plug 201 is inserted into the shaft lumen 104 such that the respective internal member 217 has a diameter sufficient to allow the internal member 217 to bend, fold and/or otherwise deform to establish substantial contact between the periphery of the respective internal member 217 and the inner surface 135 (FIGS. 2 and 3) of the shaft lumen 104. This engagement creates a substantially fluid tight barrier that prevents any epoxy 123 (FIGS. 2 and 3) from flowing or migrating through the shaft lumen 104.

Figure 12:
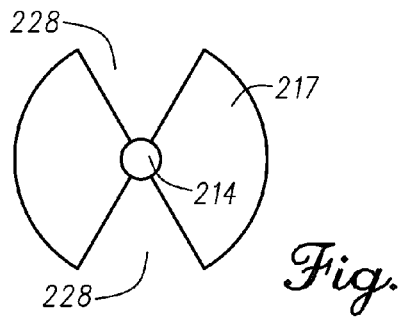
FIG. 12 is a top plan view of a second embodiment for a first internal member of the shaft plug showing a multiple cut-away configuration.
Figure 14:
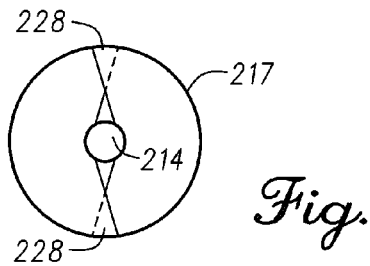
FIG. 14 is a top plan of the second embodiment for a first internal member showing a multiple cut away configuration in a deformed condition.

Alternatively, as depicted in FIG. 12, one or more of the plurality of internal members 217 may define a plurality of deformable cut-aways 228 that extends from the axial shaft member 214 to the periphery of the respective internal member 217. As shown in FIG. 14, the plurality of cut-aways 228 also facilitates deformation of the respective internal member 217 when the shaft plug 201 is inserted into the shaft lumen 104 (FIGS. 1-3) such that the respective internal member 217 has a diameter sufficient to allow the respective internal member 217 to bend, fold and/or otherwise deform to establish substantial contact between the periphery of the respective internal member 217 and the inner surface 135 (FIGS. 2 and 3) of the shaft lumen 104. This engagement establishes a substantially fluid tight barrier that prevents any epoxy (FIGS. 2 and 3) from flowing or migrating through the shaft lumen 104.

Figure 10:
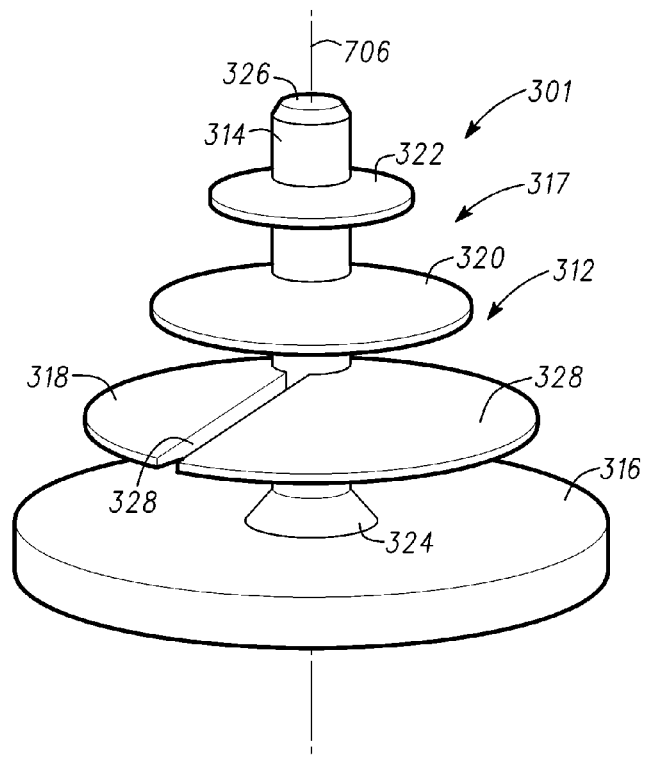
FIG. 10 is an elevated perspective view of a third embodiment of a shaft plug.
Figure 15:
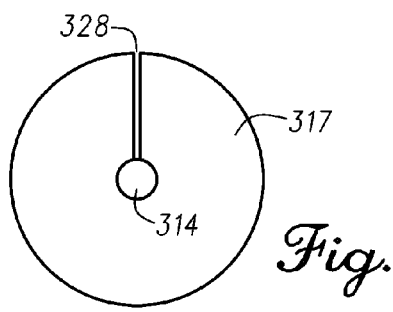
FIG. 15 is top plan view of a third embodiment for a first internal member of the shaft plug showing a single slit configuration.
Figure 17:
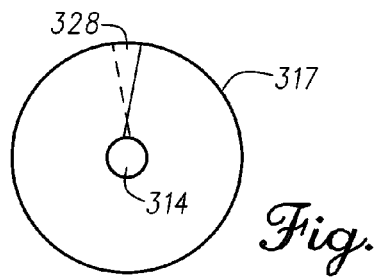
FIG. 17 is a top plan view of the third embodiment for a first internal member showing the single slit configuration in a deformed condition.

Referring to FIG. 10, a third embodiment of the shaft plug, designated 301, may form a shaft plug body 312 having substantially the same configuration as shaft plug 101 with the exception that one or more of the plurality of internal members 317, for example the first internal member 318, may define a different type of deformation that also allows the first internal member 318 to deform and establish substantial contact with the surface of the shaft lumen 104 (FIGS. 1-3). As shown, in some embodiments the shaft plug 301 may include an axial shaft member 314 defining a distal end 324 and a proximal end 326 with a sealing member 316 formed at the distal end 324 of the axial shaft member 314 that is configured to seal off the lumen opening 108 of the shaft lumen 104. The shaft plug body 312 further includes a plurality of internal members 317, for example, a first internal member 318, a second internal member 320, and a third internal member 322, which extend outwardly at a substantially perpendicular angle along the axial shaft member 314 relative to the longitudinal axis 706 defined by the axial shaft member 314. As shown in FIG. 15, the shaft plug 301 differs from shaft plug 101 in that one or more of the plurality of internal members 317 has a deformable slit 328 that extends from the axial shaft member 314 to the periphery of the respective internal member 317. Referring to FIG. 17, the deformable slit 328 facilitates deformation of the respective internal member 317 when the shaft plug 301 is inserted into the shaft lumen 104 such that the respective internal member 317 has a diameter sufficient to allow the respective internal member 317 to bend, fold and/or otherwise deform in order to establish substantial contact between the periphery of the respective internal member 317 and the inner surface 135 (FIGS. 2 and 3) of the shaft lumen 104. This engagement creates a substantially fluid tight barrier within the shaft lumen 104 that prevents any epoxy 123 (FIGS. 2 and 3) from flowing or migrating through the shaft lumen 104.

Figure 16:
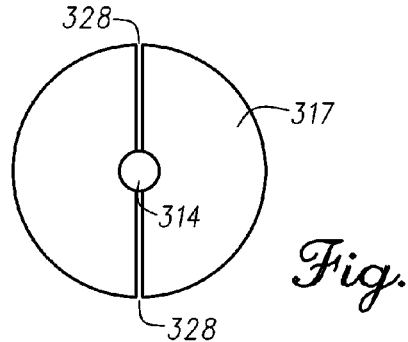
FIG. 16 is a top plan view of a fourth embodiment for a first internal member of the shaft plug showing a multiple slit configuration.
Figure 18:
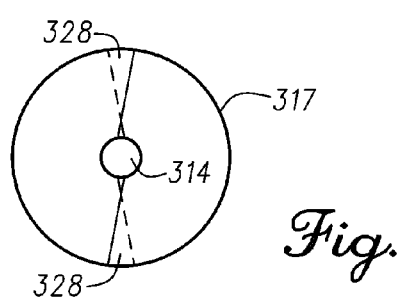
FIG. 18 is a top plan view of the fourth embodiment for the first internal member of the shaft plug showing the multiple slit configuration in a deformed condition.

Alternatively, as depicted in FIG. 16, one or more of the internal members 317 may define a plurality of deformable slits 328 that extend from the axial shaft member 314 to the periphery of the respective internal member 317. As shown in FIG. 18, the plurality of slits 328 also facilitates deformation of the respective internal member 317 when the shaft plug 301 is inserted into the shaft lumen 104 such that the respective internal member 317 has a diameter sufficient to allow the respective internal member 317 to bend, fold and/or otherwise deform to establish substantial contact between the periphery of the respective internal member 317 and the inner surface 135 (FIGS. 2 and 3) of the shaft lumen 104. This engagement establishes a substantially fluid tight barrier that prevents any epoxy (FIGS. 2 and 3) from flowing or migrating through the shaft lumen 104.

Figure 19:
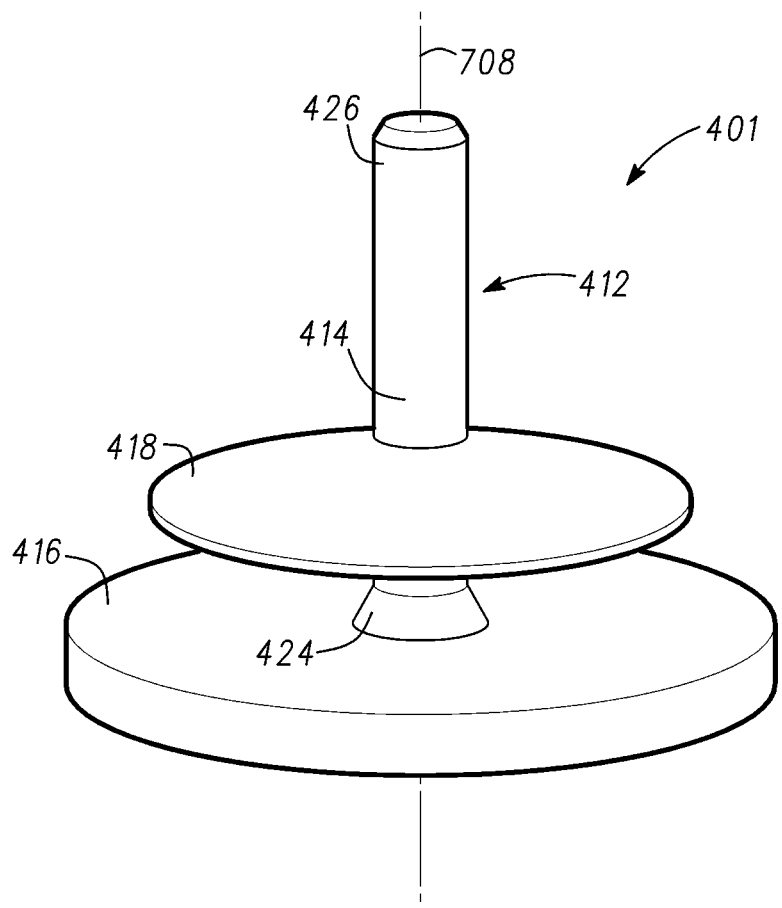
FIG. 19 is a perspective view of a fourth embodiment of a shaft plug.

Referring to FIG. 19, a fourth embodiment of the shaft plug, designated 401, may form a shaft plug body 412 having substantially the same configuration as shaft plug 101 with the exception that the shaft plug 401 defines only one internal member rather than a plurality of internal members as embodied by shaft plugs 101, 201 and 301. As shown, the shaft plug 401 includes an axial shaft member 414 defining a distal end 424 and a proximal end 426 with a sealing member 416 formed at the distal end 424 of the axial shaft member 414. The shaft plug 401 further includes an internal member 418, which extends outwardly in perpendicular fashion along the axial shaft member 414 relative to the longitudinal axis 708 defined by the axial shaft member 414. The sealing member 416 is configured to seal off the lumen opening 108 (FIGS. 1-3) of the shaft lumen 104 (FIGS. 1-3) when the shaft plug 401 is engaged within the shaft lumen 104. In some embodiments, the internal member 418 has a generally circular configuration with a diameter substantially similar or slighter larger than the diameter of the shaft lumen 414 such that the periphery of the internal member 418 substantially contacts the inner surface 135 (FIGS. 2 and 3) of the shaft lumen 104 to establish a substantially fluid tight seal within the shaft lumen 104 that prevents fluid flow communication through the shaft lumen 104 when the shaft plug 401 is engaged to the shaft lumen 104.

Referring back to FIG. 6, some embodiments of the shaft plug 101 may be manufactured using the following dimensions for the shaft plug body 112. In some embodiments, the sealing member 116 may have a height 822 of about 0.050 inches as defined between the first and second flat surfaces 128 and 130 and a diameter 800 of about 0.320 inches. The first internal member 118 may be located at a length 820 of about 0.160 inches as defined between the first flat surface 128 and the third flat surface 132 and have a diameter 802 of about 0.280 inches. The second internal member 120 may be located at a length 818 of about 0.280 inches as defined between the first flat surface 128 and the fourth flat surface 136 and have a diameter 804 of about 0.230 inches. The third internal member 122 may be located at a length 816 of about 0.370 inches as defined between the first flat surface 128 and the fifth flat surface 140 and have a diameter 806 of about 0.180 inches. Finally, the axial shaft member 114 may have a length 814 of about 0.510 inches and a diameter 808 of about 0.070 inches.

Referring back to FIG. 5, the first, second and third internal members 118, 120, and 122 of shaft plug 101 may be manufactured using the following angular values. The first internal member 118 may define a first tapered surface 134 extending from the axial shaft member 114 at an angle 600 of about a 10.8 degrees between planes 500 and 506, while the second internal member 120 may define a second tapered surface 138 extending from the axial shaft member 114 at an angle 602 of about a 14.0 degrees between planes 502 and 508. Finally, the third internal member 122 may define an third tapered surface 142 extending from the axial shaft member 114 at an angle 604 of about a 20.0 degrees between planes 504 and 510.

Figure 20:
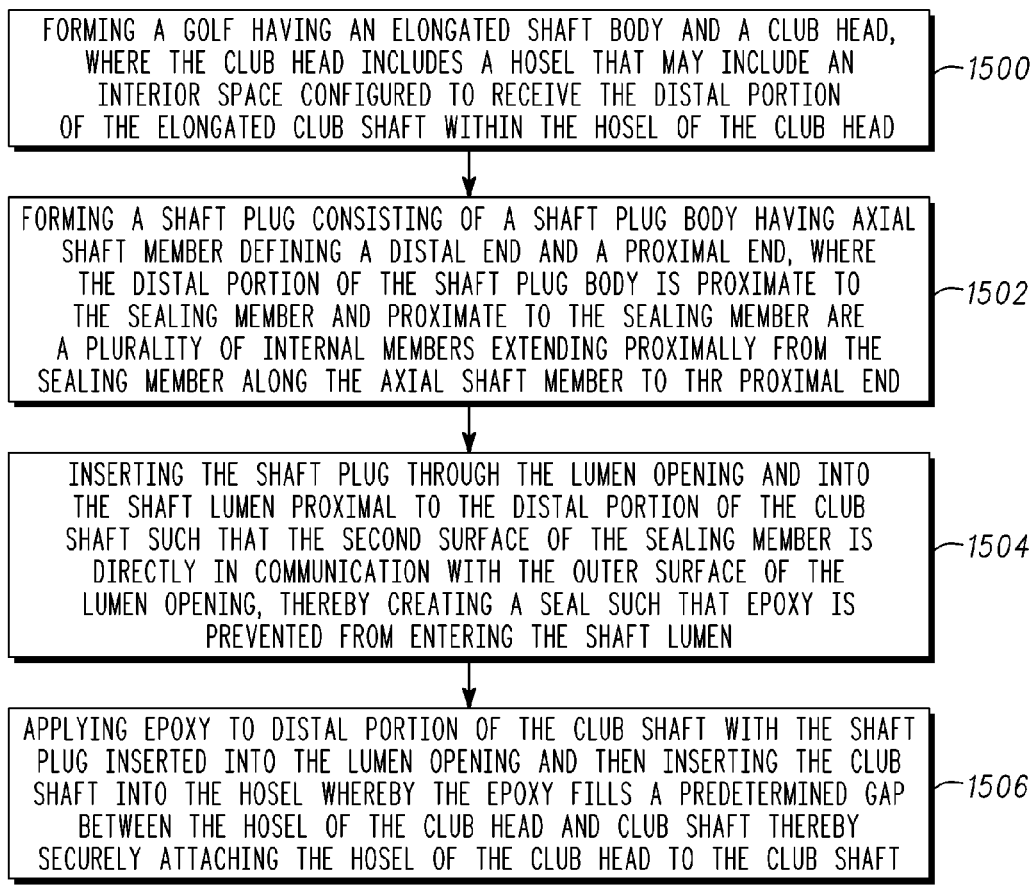
FIG. 20 is a flow chart illustrating one method of manufacturing a golf club with a shaft plug.

Referring to FIG. 20, one method for manufacturing the golf club 100 is illustrated. At block 1500, forming a golf club 101 having a club shaft 102 and club head 109, wherein the club head 109 includes a hosel 111 defining an interior space 129 configured to engage the distal portion 125 of the club shaft 102 to the hosel 111 of the club head 109. At block 1502, forming a shaft plug 101 having a shaft plug body 112 with an axial shaft member 114 defining a distal end 124 and a proximal end 126, wherein a sealing member 116 is formed the distal end 124 and a plurality of internal members 117 extend outwardly at a substantially perpendicular angle from the axial shaft member 114 between the sealing member 116 and the proximal end 126 of the axial shaft member 114. At block 1504, inserting the shaft plug 101 into the shaft lumen 104 through the lumen opening 108 defined at the distal portion 125 of the club shaft 102 such that the inner surface 130 of the sealing member 116 is in direct communication with the outer surface 133 of the club shaft 102 proximate the lumen opening 108 and one or more of the plurality of internal members 117 becomes deformed within the shaft lumen 104, thereby sealing off the lumen opening 108 and preventing fluid flow communication with the shaft lumen 104. Finally, at block 1506, applying epoxy 123 to distal portion 125 of the club shaft 102 and then inserting the club shaft 102 into the hosel 111 whereby the epoxy 123 is disposed between the hosel 111, the shaft plug 101, and the club shaft 102 such that the distal portion 125 of the club shaft 102 is secured within the hosel 111 of the club head 109.

While a particular order of actions is illustrated in FIG. 20, these actions may be performed in other temporal sequences. For example, two or more actions depicted in FIG. 20 may be performed sequentially, concurrently, or simultaneously. Alternatively, two or more actions depicted may be performed in reversed order. Further, one or more actions depicted in FIG. 20 may not be performed at all. The apparatus, methods, and articles of manufacture described herein are not limited in this regard.

In some embodiments, the shaft plug 101 may be manufactured using a resin material, a polypropylene material, a polyurethane material, or a combination thereof.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A shaft plug comprising:
   an axial shaft member defining a proximal end and a distal end along a longitudinal axis defined by the axial shaft member;
   a sealing member formed at the distal end of the axial shaft member and extending outwardly at a substantially perpendicular angle relative to the longitudinal axis; and a first internal member, a second internal member, and a third internal member, each of the first, the second, and the third internal members being deformable and having a substantially circular configuration that defines a diameter, each of the first, the second, and the third internal members including a flat surface extending outwardly along the axial shaft member at a substantially perpendicular angle relative to the longitudinal axis of the axial shaft member and a tapered surface that extends from the axial shaft member at a non-perpendicular angle;

wherein the diameter of each of the first, the second, and the third internal members decrease with location from the sealing member and the non-perpendicular angle of the tapered surface of each of the first, the second, and the third internal members increases with location from the sealing member; and the diameter of the first internal member is approximately 0.280 inches and the non-perpendicular angle of the first member is approximately 10.8 degrees, the diameter of the second internal member is approximately 0.230 inches and the non-perpendicular angle of the second member is approximately 14.0 degrees, and the diameter of the third internal member is approximately 0.180 inches and the non-perpendicular angle of the third member is approximately 20.0 degrees.

2. The shaft plug of claim 1, wherein the first internal member is formed between the sealing member and the second internal member, wherein the second internal member is formed between the first internal member and the third internal member, and wherein the third internal member is formed between the second internal member and the proximal end of the axial shaft member.

3. The shaft plug of claim 1, wherein the shaft plug is made from a polypropylene material, a polyurethane material or a combination thereof.

4. A golf club comprising:
a club shaft defining an elongated shaft body having a distal portion and a proximal portion, wherein the club shaft defines a shaft lumen in communication with a lumen opening formed at an end of the distal portion of the elongated shaft body;
a hosel sleeve engaged to the distal portion of the club shaft, wherein the hosel sleeve defines a sleeve recess configured to receive the distal portion of the elongated shaft body; and
a shaft plug configured to engage the shaft lumen of the club shaft, the shaft plug comprising;
an axial shaft member defining a proximal end and a distal end along a longitudinal axis defined by the axial shaft member;
a sealing member formed at the distal end of the axial shaft member and extending outwardly at a substantially perpendicular angle relative to the longitudinal axis; and
a first internal member, a second internal member, and a third internal member, each of the first, the second, and the third internal members being deformable and having a substantially circular configuration that defines a diameter, each of the first, the second, and the third internal members including a flat surface extending outwardly along the axial shaft member at a substantially perpendicular angle relative to the longitudinal axis of the axial shaft member and a tapered surface that extends from the axial shaft member at a non-perpendicular angle;

wherein the diameter of each of the first, the second, and the third internal members decrease with location from the sealing member and the non-perpendicular angle of the tapered surface of each of the first, the second, and the third internal members increases with location from the sealing member; and the diameter of the first internal member is approximately 0.280 inches and the non-perpendicular angle of the first member is approximately 10.8 degrees, the diameter of the second internal member is approximately 0.230 inches and the non-perpendicular angle of the second member is approximately 14.0 degrees, and the diameter of the third internal member is approximately 0.180 inches and the non-perpendicular angle of the third member is approximately 20.0 degrees.

5. The golf club of claim 4, further comprising:
a club head engaged to the hosel sleeve, the club head defining a face, a back, a top, a sole and a hosel, wherein the hosel is configured to receive the hosel sleeve therein.

6. The golf club of claim 4, further comprising:
a club head engaged to the hosel sleeve, the club head defining a face, a back, a top, a sole and a hosel, wherein the hosel is configured to receive the hosel sleeve therein; and
an epoxy disposed within a space defined between the hosel sleeve, the club shaft and the shaft plug.

7. The golf club of claim 4, further comprising:
a club head engaged to the hosel sleeve, the club head defining a face, a back, a top, a sole and a hosel, wherein the hosel is configured to receive the hosel sleeve therein; and
an epoxy disposed within a space defined between the hosel sleeve, the club shaft and the shaft plug,
wherein the shaft plug is configured to substantially seal off the lumen opening when engaged to the shaft lumen such that the epoxy within the space is prevented from entering the shaft lumen.

8. The golf club of claim 4, wherein the sealing member is configured to seal off the shaft lumen of the club shaft when the shaft plug is engaged to the shaft lumen to prevent entry of an epoxy that coats the distal portion of the club shaft.

9. A method to manufacture a golf club comprising:
forming club shaft defining a distal portion and a proximal portion, wherein the club shaft defines a shaft lumen in communication with a lumen opening formed at an end of the distal portion;
forming a hosel sleeve engaged to the distal portion of the club shaft, wherein the hosel sleeve defines a sleeve recess configured to receive the distal portion of the club shaft; and
forming a shaft plug including:
an axial shaft member defining a proximal end and a distal end along a longitudinal axis defined by the axial shaft member;
a sealing member formed at the distal end of the axial shaft member and extending outwardly at a substantially perpendicular angle relative to the longitudinal axis; and
a first internal member, a second internal member, and a third internal member, each of the first, the second, and the third internal members being deformable and having a substantially circular configuration that defines a diameter, each of the first, the second, and the third internal members including a flat surface extending outwardly along the axial shaft member at a substantially perpendicular angle relative to the longitudinal axis of the axial shaft member and a tapered surface that extends from the axial shaft member at a non-perpendicular angle;

wherein the diameter of each of the first, the second, and the third internal members decreases with location from the sealing member and the non-perpendicular angle of the tapered surface of each of the first, the second, and the third internal members increases with location from the sealing member; and the diameter of the first internal member is approximately 0.280 inches and the non-perpendicular angle of the first member is approximately 10.8 degrees, the diameter of the second internal member is approximately 0.230 inches and the non-perpendicular angle of the second member is approximately 14.0 degrees, and the diameter of the third internal member is approximately 0.180 inches and the non-perpendicular angle of the third member is approximately 20.0 degrees;

engaging the shaft plug to the shaft lumen such that the shaft plug substantially seals off the lumen opening;

applying epoxy to the distal portion of the club shaft; and engaging the distal portion of the club shaft within the hosel sleeve such that the epoxy is prevented from entering the shaft lumen.

10. The method of claim 9, wherein engaging the shaft plug to the shaft lumen includes sealing off the lumen opening by the sealing member to disrupt fluid flow communication between the shaft lumen and the epoxy.

11. The method of claim 9, wherein engaging the shaft plug to the shaft lumen comprises deforming at least one of the first, the second, and the third internal members.

12. The method of claim 9, wherein engaging the shaft plug to the shaft lumen comprises deforming the at least one of the first, the second, and the third internal members such that fluid flow communication through the shaft lumen is prevented.

13. The method of claim 9, wherein forming the shaft plug comprises forming the first internal member between the sealing member and the second internal member, and wherein the first sealing member is deformable.

14. The method of claim 9, wherein forming the shaft plug comprises forming the shaft plug from a polypropylene material, a polyurethane material, or a combination thereof.

* * * * *